United States Patent
Crossling

(12) 
(10) Patent No.: US 6,181,804 B1
(45) Date of Patent: Jan. 30, 2001

(54) IMPRINT IDENTIFICATION SYSTEM

(76) Inventor: Dudley Bryan Crossling, 23 Burn River Rise, Veille Park, Torquay, Devon TQ2 7RH (GB)

(*) Notice: Under 35 U.S.C. 154(b), the term of this patent shall be extended for 0 days.

(21) Appl. No.: 09/101,486

(22) PCT Filed: Jan. 29, 1997

(86) PCT No.: PCT/GB97/00240
§ 371 Date: Jul. 14, 1998
§ 102(e) Date: Jul. 14, 1998

(87) PCT Pub. No.: WO97/28513
PCT Pub. Date: Aug. 7, 1997

(30) Foreign Application Priority Data

Jan. 31, 1996 (GB) ................................................. 9601955

(51) Int. Cl.[7] .................................................. G06K 9/00
(52) U.S. Cl. .......................................... 382/115; 382/100
(58) Field of Search ............................ 382/115, 124–127, 382/100, 209

(56) References Cited

U.S. PATENT DOCUMENTS

| | | |
|---|---|---|
| 4,607,384 | 8/1986 | Brooks . |
| 5,025,476 * | 6/1991 | Gould et al. ........................ 382/115 |
| 5,465,308 * | 11/1995 | Hutcheson et al. .................. 382/159 |
| 5,479,528 * | 12/1995 | Speeter ................................. 382/115 |
| 5,613,014 * | 3/1997 | Eshera et al. ........................ 382/124 |

OTHER PUBLICATIONS

European Convention on Security and Detection (Conf. Publ. No. 408), Brighton, UK, May 16–18, 1995, ISBN 0–85296–640–7, 1995, London, UK, pp. 267–271, XP000672461 Philips M: "A Shoeprint image coding and retrieval system".

* cited by examiner

Primary Examiner—Bhavesh Mehta
(74) Attorney, Agent, or Firm—Ira S. Dorman

(57) ABSTRACT

A digital image is captured from an imprint left at the scene of a crime with a predetermined reproduction ratio. Suitable capture apparatus comprises a digital camera 1 supported in a stand 2 above the image 3. The captured image is displayed on a computer screen, cropped to a predetermined size, and the co-ordinates of any unique identification features in the image are recorded in computer memory, preferably together with information on the size and nature of such features. The sets of co-ordinates are stored in a database and compared to identify similar sets of co-ordinates likely to originate from the same article. The data can also be compared with a second database of co-ordinate data taken from the footwear of known offenders in order to link crimes with offenders.

10 Claims, 4 Drawing Sheets

IMPRINT IDENTIFICATION SYSTEM

TECHNICAL FIELD OF THE INVENTION

This invention relates to a method and apparatus for identifying footwear or other impressions left, for example, at places where crimes have been committed. Although the following description gives footwear as a specific example, the system would also be applicable to impressions left by vehicle tyres or tools for example.

BACKGROUND

Systems have already been proposed for recording and cataloguing footwear patterns taken from footprints left at scenes of crimes, but their use is limited by the fact that many shoes may possess the same sole patterns.

The present invention seeks to provide a novel and inventive system of imprint identification.

SUMMARY OF THE INVENTION

The present invention proposes a method of imprint identification which comprises:

producing, with a predetermined reproduction ratio, a digital image of an imprint produced by an article;

displaying said image on a computer screen;

recording in computer memory the coordinates of any unique identification features in said image;

storing the set of co-ordinates thereby produced in a database together with sets of co-ordinates similarly taken from other images; and comparing said sets of co-ordinates to identify similar sets of co-ordinates likely to originate from the same article.

The image is captured at a predetermined reproduction ratio, i.e. a predetermined ratio between the size of the digital image and the size of the original image, to ensure that the system is of sufficient reliability to be used as evidence in legal proceedings.

The image is preferably produced by recording the light image directly from the imprint rather than by, for example, taking a cast. The elimination of any requirement for taking measurements from a cast or similar intermediate copy of the image, which may be subject to physical distortion (e.g. stretching or shrinking) or operator error in taking measurements, increases the accuracy and reliability of the system.

The invention also provides apparatus for use in the identification of imprints as defined in the appended Claims.

An embodiment of the invention may include the claimed features in any combination.

DEFINITIONS

The term "imprint" is intended to cover any form of physical impression, whether formed as a depression in a pliable surface or as a deposit or other physical change on a rigid surface, whether visible or invisible.

BRIEF DESCRIPTION OF THE DRAWINGS

The following description and the accompanying drawings referred to therein are included by way of non-limiting example in order to illustrate how the invention may be put into practice. In the drawings.

DETAILED DESCRIPTION OF THE DRAWINGS

Figure 1:
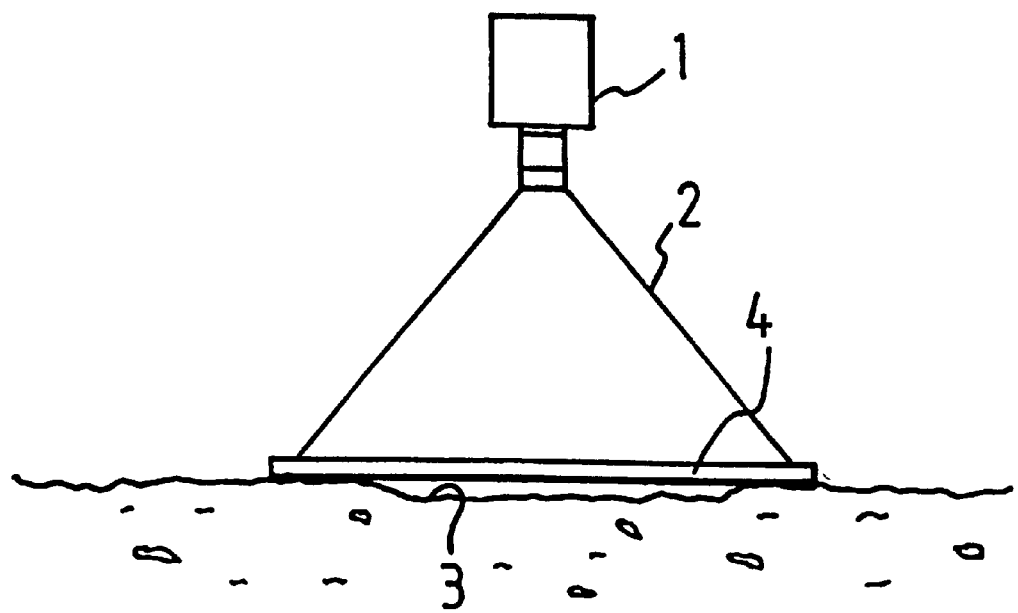
FIG. 1 is a side elevation of a camera assembly for use in the method of the invention.

Referring to FIG. 1, a camera 1 is provided with a stand 2 of a form which is capable of firmly supporting the camera above a footprint 3. The footprint may be formed by an indentation in a pliable substrate or it could have been deposited on a surface as a visible print, or later rendered visible by application of a powder or chemical stain. The stand preferably incorporates a rectangular base or frame 4 for accurate positioning about the footprint to ensure constant lateral positioning of the camera. The frame also positions the camera at a fixed distance from the image to ensure that there is a predetermined reproduction ratio between the size of the image produced by the camera and the size of the original image. This is important when the system is to be used for producing evidence in legal proceedings since it eliminates any requirement for re-sizing of the digital images. At increased cost, the camera could be provided with a sensing system to automatically adjust the size of the received image relative to the size of the imprint, according to the distance between the camera and the surface bearing the imprint.

When correctly set up the camera is operated to record the light image of the footprint. The image may be recorded in several ways. For example, a video camera may be used to store images on a video tape from which a still image can be produced using a digitizer or frame grabber. Another possibility would be to use a digital camera incorporating a charge-coupled device and which stores the image obtained by the charge-coupled device in internal RAM for later downloading. Although a photographic camera could be used to record the image on photographic film which is later developed and scanned to produce a digital image, or a positive print made from the negative and scanned, this option is undesirable since it introduces the possibility of distortion in the intermediate negative or print. The desired end result is a highly accurate bitmapped digital image of the original footprint at a known reproduction ratio.

Figure 2:
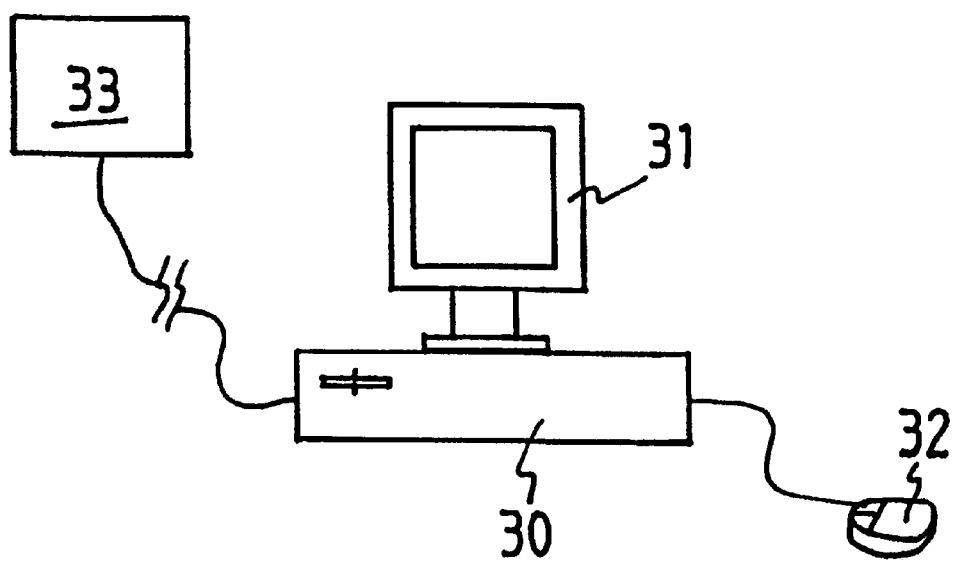
FIG. 2 is a computer for use in the method.

The bitmapped image is loaded into a computer 30 (FIG. 2) running under specially produced graphics software, and displayed on the screen of a high resolution monitor 31. The software displays a pointer which can be moved over the image using a mouse 32, trackball or similar input device. As is well known, bitmapped images are stored and displayed as a rectangular matrix of individual pixels (picture elements) which are individually identified by their x and y co-ordinates. The top left corner of the image is conventionally given an x,y co-ordinate of 0,0. Accurate positioning of the footprint image is achieved by providing a range of rectangular boxes for display, which are sized to fit known standard sizes of footwear image. Boxes can be selected by the mouse and positioned on the displayed image to enable the smallest box to be chosen which encloses the entire image. The area of the image inside the box is then cropped from the image. (Note that cropping does not result in any re-sizing of the footprint image.) The footprint image is now positioned at the top left of the displayed box. The position of any characterising marks in the sole is visually identified and recorded in computer RAM by positioning the cursor over the feature and clicking the mouse button, the co-ordinates being taken from the top left corner of the cropped image.

Figure 3:
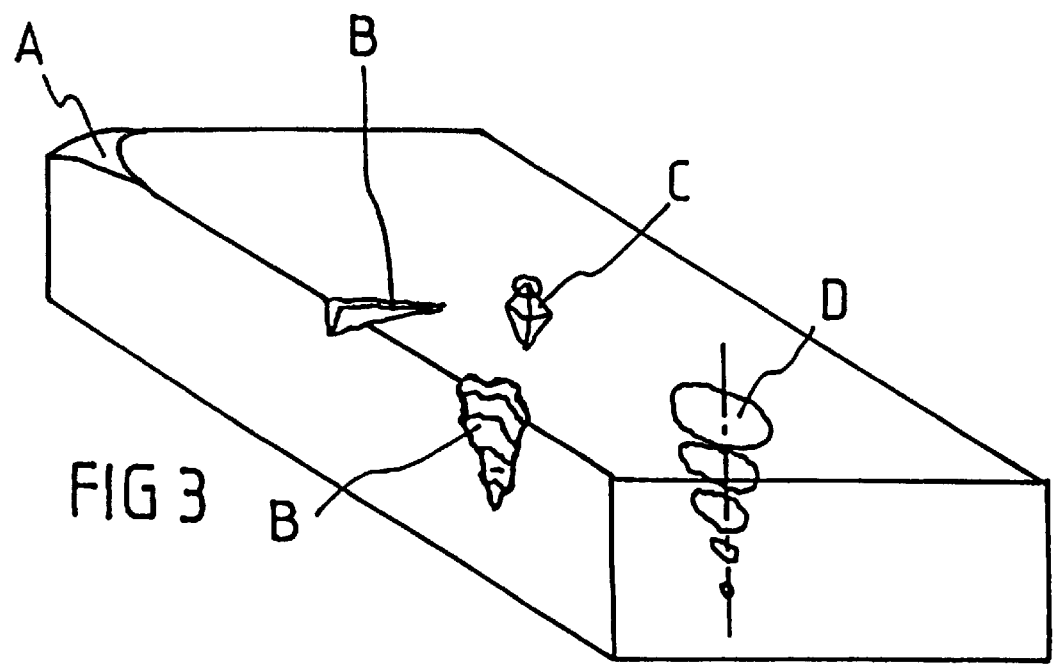
FIG. 3 is a transparent representation of part of a sole showing various forms of damage.

FIG. 3 shows a transparent view of a typical section of the sole of a shoe. Several examples of features which can be recorded are shown in the Figure, namely:

A—Areas of wear

B—Points of damage (e.g. cuts)

C—Inclusions (generally pieces of flint or metal)

D—Manufacturing (moulding) defects

In most cases at least one of these features will be present. The set of co-ordinates thereby obtained will provide a unique digital profile of the sole from which the imprint was produced.

Features can be enhanced by suitable image processing in software. As a simple example, reducing the number of grey levels in an image can often cause features to become more clearly defined.

When plotting is completed the set of co-ordinates is added to a database, which ideally is held at a central location (33—FIG. 2) remotely accessible using a suitable modem and access code. By comparing and correlating records obtained from different scenes of crimes, offences can be linked and the activities of an individual offender can be tracked over a period. Although old cuts or defects will tend to fade as a sole is subjected to wear, and new areas of damage will be added, it should be appreciated that most crime detection work is concerned with a large number of crimes committed by a small number of individuals rather than a large number of un-related offences. In most cases therefore it is possible to obtain enough records to provide a continuous history of an item of footwear. In cases where only partial impressions can be obtained it will generally still be possible to recover useful comparative data.

The usefulness of the system is further enhanced by producing bitmapped images from the footwear of known individuals. Suitable apparatus for obtaining such images is described below in relation to FIGS. 7 and 8. The co-ordinate information obtained from such images is then added to a second database containing information from known offenders, with which the co-ordinate information taken from prints at the scene of a crime can be compared to facilitate identification of the offender.

When a database is scanned in an attempt to produce a match against a new record, the database is scanned multiple times. After each unsuccessful scan the positional co-ordinates are all incremented or decremented by one unit (x or y value) and the database is then re-scanned to try and locate a matching set of co-ordinates. The process is repeated until a matching set of co-ordinates is found or until a predetermined number of scans have been carried out unsuccessfully. Effectively, this process shifts the image around until a match is achieved, thereby allowing for slight mis-registration between the new image and the image from which a corresponding set of characteristic co-ordinates have been obtained. The maximum shift is predetermined according to the maximum amount of mis-registration which is likely to occur, which should in any case be small due to the use of fixed-size cropping boxes.

It is to be noted that the method is completely non-destructive so that the original imprint is retained in a completely unaltered state. After the digitised image has been obtained, the surface bearing the impression can therefore be retained as primary evidence if the substrate bearing the impression is capable of removal for storage. If the impression is left on a fixed surface a gel or adhesive lift, a cast, or a photograph may be taken to retain the primary evidence for later disclosure or production in a court of law.

Figure 4:
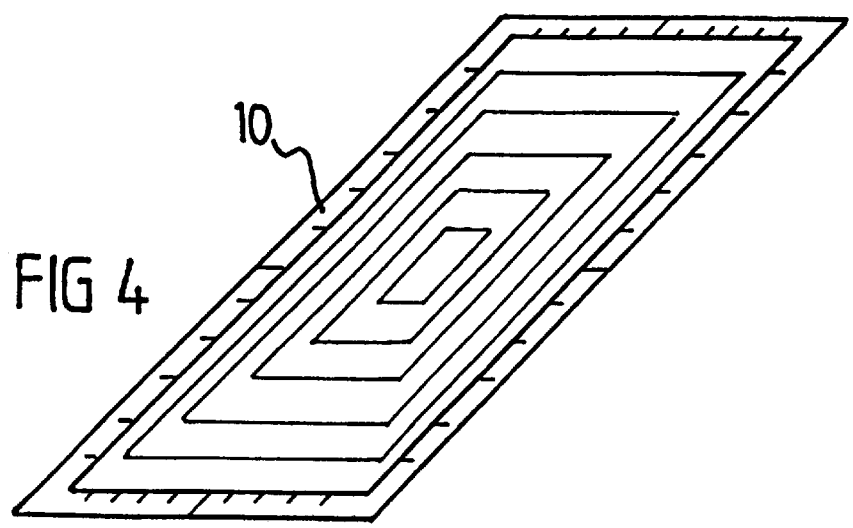
FIG. 4 is a transparency plate for use with the camera assembly.

It has already been noted above that the camera should be correctly positioned relative to the footprint. FIG. 4 shows a screen 10 which can be attached to the frame 4 (FIG. 1) and superimposed on the imprint, to permit accurate and repeatable lateral positioning of the camera relative to the imprint. The screen bears a set of concentric etched or engraved rectangles each conforming to a particular size of sole. Other suitable positioning markers could be used.

It should similarly be noted that the resolution (number of pixels in the footprint image) should also be constant to achieve directly comparable positional data, which is ensured by using a fixed reproduction ratio.

Generally, the bitmapped image will be stored on disk or another semi-permanent medium for future reference, but will not usually be added to the database. An advantage of the method is that the co-ordinate data requires very little storage space compared with a full bitmapped image. Data processing using the coordinate information is therefore very fast so that a large number of records can be searched and compared in a very short period.

Figure 5:
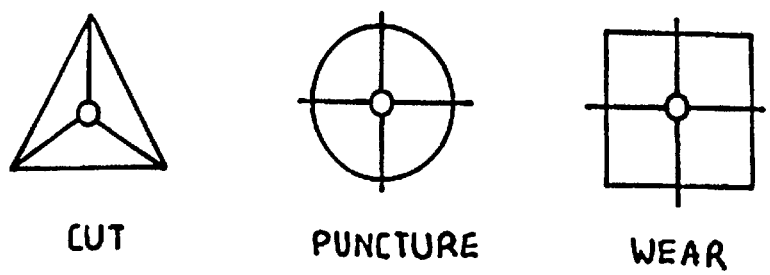
FIG. 5 is a set of symbols for identifying the kind of damage which is present.
Figure 5:
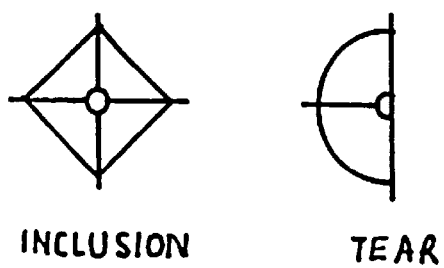

In addition to plotting the co-ordinates of characterising features, further useful data can be obtained from the image and stored in the database. For example, graphic symbols can be displayed representing different kinds of characterising feature (e.g. cut, puncture, wear, inclusion, tear etc. as illustrated in FIG. 3). Examples of such symbols are shown in FIG. 5. It will be noted that each symbol includes a datum point (represented by a small circle) which is the co-ordinate reference position. By selecting the appropriate symbol with the mouse, positioning the datum point of the symbol on the appropriate area and clicking the mouse, the nature of the feature can be recorded in computer RAM and added to the database if required, to permit more detailed comparisons to be made.

Another useful item of information which can be added to the database is the total area of each feature. This is achieved by enlarging the appropriate area of the image sufficiently to render the individual pixels visible, and manually counting the pixels. Another method would be to draw round the area with the mouse and then invoke a sub-routine within the program to calculate the number of pixels enclosed.

Figure 6:
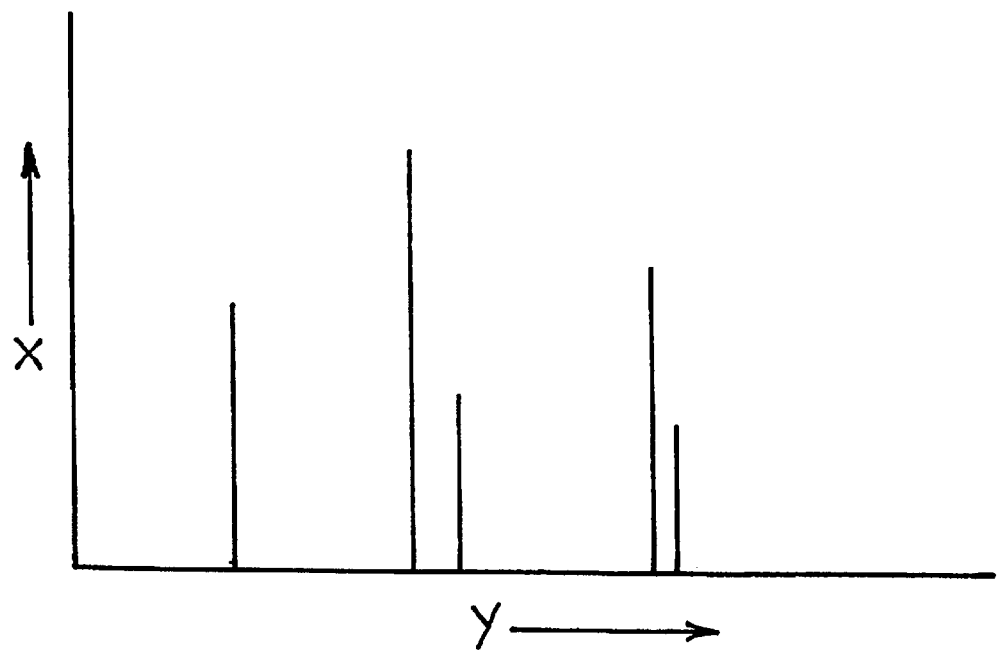
FIG. 6 is a histogram representing the co-ordinate data obtained from an image in graphic form.

It is possible to display the resulting set of co-ordinate data in histogram form, as illustrated in FIG. 6. The base line represents the distance of each feature along the y axis of the image, and each recorded feature is represented by a vertical line corresponding in height to the x co-ordinate of the feature. Such a graphic representation allows comparison of co-ordinate sets to be easily made by unskilled personnel. The height and position of a line will not change with wear, although some lines will eventually be lost as features disappear with wear. Similarly, other features due to additional damage will produce additional lines in the histogram display. However, provided a series of imprints can be obtained sufficient points of identity will usually be present to allow the history of a piece of footwear to be followed.

Figure 7:
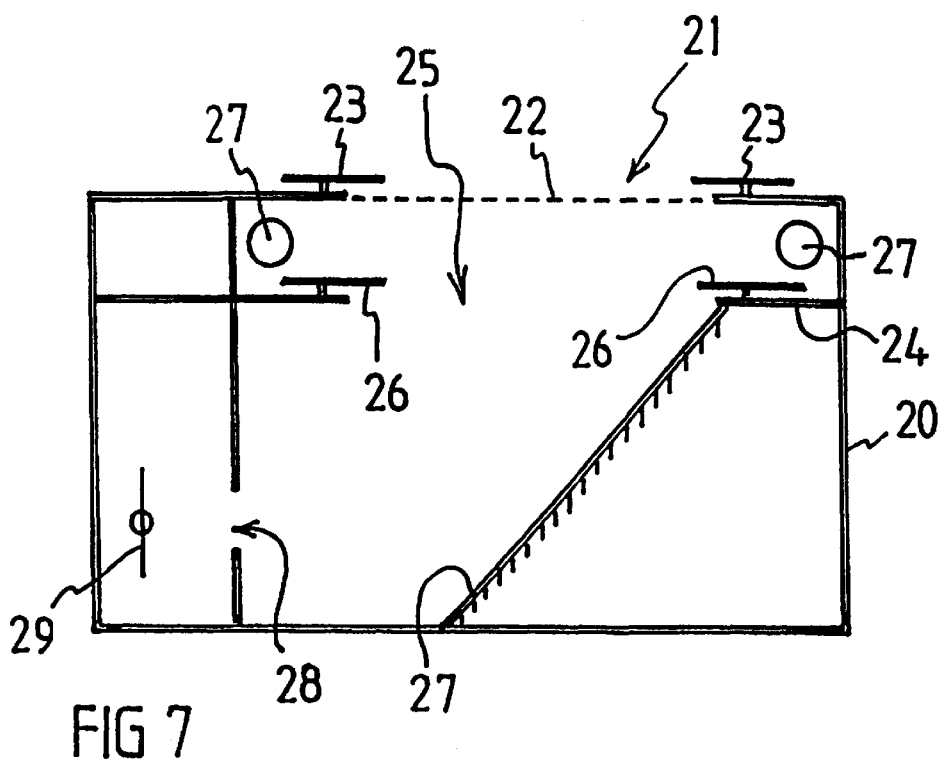
FIG. 7 is a vertical section through a light box for use in obtaining images from items of footwear for comparison purposes.
Figure 8:
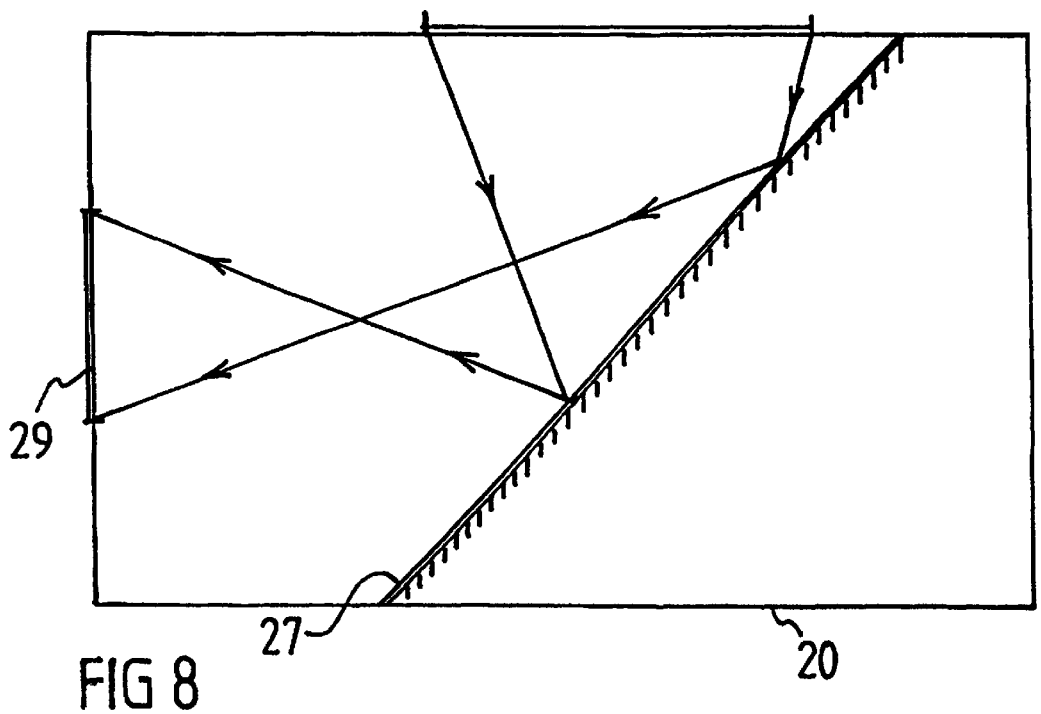
FIG. 8 is a ray diagram illustrating the operation of the light box.

Apparatus for producing a bitmapped image from an item of footwear is shown in FIG. 7. To allow the image to be directly compared with images obtained from imprints, the image of the sole is reversed. The apparatus comprises a light-proof box 20 having a rectangular opening 21 provided with a transparent screen 22 to support an item of footwear. The size of the opening 21 can be adjusted by means of opaque masks 23 which are slidably positioned along the four sides of the opening to allow the area of the opening to be precisely adjusted to make maximum use of the available area of the image recording medium. This ensures that the image is captured at maximum resolution. A scale is marked on the inner margins of the masks to allow the image to be obtained at a known reproduction ratio.

A light-proof wall 24 is mounted in the light box, having an opening 25 positioned below the opening 21. The wall is provided with a further set of laterally adjustable masks 26 which are adjusted to match the size and shape of the opening 25 to the opening 21. A set of light sources 27 (preferably strip lights) are mounted between the two sets of masks 23 and 26 at the sides of the openings 25 and 21 to provide oblique illumination of an item of footwear on the screen 22.

Beneath the wall 24 a mirror 27 is mounted at 45° to the opening 25 to direct an image of the footwear towards an aperture 28 formed in the side of the light box 20. Behind this aperture there is mounted a suitable image recording medium 29 such as a camera employing light-sensitive film or a charge-coupled device.

In use, an item of footwear is placed on the screen 22 with its sole against the screen and covered with opaque material to exclude external light. The sole is evenly illuminated by the light sources 27, and as demonstrated in the ray diagram of FIG. 8, the image obtained from the recording medium is laterally reversed. The captured bitmapped image can be stored for direct comparison purposes and/or for production in evidence. Co-ordinate data on any identifying features can again be obtained from the image as explained above for inclusion in the database relating to known offenders.

It will be appreciated that images could also be captured from items of footwear by other means, e.g. by using a laser scanner or the like.

Whilst the above description lays emphasis on those areas which, in combination, are believed to be new, protection is claimed for any inventive combination of the features disclosed herein:

What is claimed is:

1. A method of imprint identification which comprises:

producing, with a predetermined reproduction ratio, a digital image of an imprint produced by an article;

displaying said image on a computer screen;

recording in computer memory the co-ordinates of any unique identification features in said image caused by defects in said article;

storing the set of co-ordinates thereby produced in a database together with sets of co-ordinates similarly taken from other images; and comparing said sets of co-ordinates to identify similar sets of co-ordinates likely to originate from the same article.

2. A method according to claim 1, in which the digital image is produced by recording a light image derived directly from the imprint.

3. A method according to claim 1, in which the image displayed on the computer screen is cropped to a selected one of a number of predetermined sizes.

4. A method according to claim 1, in which the nature of the identifying feature is recorded in association with each co-ordinate.

5. A method according to claim 1, in which the area of each feature is recorded in association with each co-ordinate.

6. A method according to claim 1, in which a stored set of coordinates is compared with other stored sets of co-ordinates a plurality of times, with the co-ordinates being incremented or decremented between comparisons.

7. A method according to claim 1, which comprises graphically displaying a set of stored co-ordinates mapped along two mutually perpendicular axes.

8. Apparatus for use in the identification of imprints, which comprises:

image recording means (1) for capturing an image of an imprint produced by an article, said recording means being provided with means (2) for producing a predetermined reproduction ratio between the imprint and the image;

a computer (30) for holding said image in digital form, said computer having a monitor (31) for displaying said image, and manual input means (32) for imputting the co-ordinates of characterising features of said image into computer memory; and a database (33) which holds said characteristic co-ordinate data thereby obtained, and which includes the co-ordinates of unique identification features caused by defects in said article.

9. Apparatus according to claim 8, in which said means of producing a fixed reproduction ratio comprises a support structure (2) for positioning the recording means relative to an imprint.

10. Apparatus according to claim 8, comprising a screen (10) carrying positioning markers for superimposing on said imprint.

* * * * *